(12) United States Patent
Yamamoto (10) Patent No.: US 10,278,406 B2
(45) Date of Patent: May 7, 2019

(54) METHOD FOR PRODUCING ROASTED COFFEE BEANS IN RELATION TO CARBON MONOXIDE GENERATED

(71) Applicant: Hiroyuki Yamamoto, Tokyo (JP)

(72) Inventor: Hiroyuki Yamamoto, Tokyo (JP)

( * ) Notice: Subject to any disclaimer, the term of this patent is extended or adjusted under 35 U.S.C. 154(b) by 0 days.

(21) Appl. No.: 15/752,913

(22) PCT Filed: Aug. 1, 2016

(86) PCT No.: PCT/JP2016/072502
§ 371 (c)(1),
(2) Date: Feb. 15, 2018

(87) PCT Pub. No.: WO2017/033676
PCT Pub. Date: Mar. 2, 2017

(65) Prior Publication Data
US 2018/0255802 A1 Sep. 13, 2018

(30) Foreign Application Priority Data
Aug. 26, 2015 (JP) .................................. 2015-166695

(51) Int. Cl.
*A23F 5/04* (2006.01)
*A23N 12/08* (2006.01)
(52) U.S. Cl.
CPC .................. *A23F 5/04* (2013.01); *A23N 12/08* (2013.01)
(58) Field of Classification Search
CPC .................................. A23F 5/04; A23N 12/08
See application file for complete search history.

(56) References Cited

U.S. PATENT DOCUMENTS

| 8,318,228 B2 | 11/2012 | Shigeno et al. |
| 2004/0142078 A1 | 7/2004 | Eichner |
| 2006/0165853 A1* | 7/2006 | Ekanayake ............ A23F 5/105 426/124 |
| 2008/0264269 A1 | 10/2008 | Sterzel et al. |
| 2010/0323082 A1 | 12/2010 | Shigeno et al. |

(Continued)

FOREIGN PATENT DOCUMENTS

| AU | 2004100812 A4 | 11/2004 |
| JP | H11-504518 A | 4/1999 |
| JP | 2000-050801 A | 2/2000 |

(Continued)

OTHER PUBLICATIONS

Emission Estimation Technique Manual for Coffee Roasting. 1999. Entire document.*

(Continued)

*Primary Examiner* — Anthony J Weier
(74) *Attorney, Agent, or Firm* — Osha Liang LLP (57) ABSTRACT

A method for producing roasted coffee beans includes a roasting step of supplying heat to coffee beans and thus roasting the coffee beans, a measuring step of measuring an amount of carbon monoxide generated from the coffee beans during roasting, and a stopping step of stopping supply of heat to the coffee beans in the roasting step, based on a measurement result obtained at the time of measurement of the amount of carbon monoxide and a measurement result measured beforehand regarding coffee beans different from the coffee beans at least in one of type and lot.

4 Claims, 7 Drawing Sheets

(56) References Cited

U.S. PATENT DOCUMENTS

2014/0242239 A1  8/2014  Boggavarapu

FOREIGN PATENT DOCUMENTS

| JP | 2003-265154 A | 9/2003 |
| JP | 2004-305167 A | 11/2004 |
| JP | 2006-081451 A | 3/2006 |
| JP | 2008-525755 A | 7/2008 |
| JP | 2008-178399 A | 8/2008 |
| WO | 96/35335 A1 | 11/1996 |

OTHER PUBLICATIONS

Alexia N. Gloess et al.; "Evidence of different flavour formation dynamics by roasting coffee from different origins: On-line analysis with PTR-ToF-MS;" International Journal of Mass Spectrometry; Feb. 26, 2014; pp. 324-337; http://dx.doi.org/10.1016/j.ijms.2014.02.010.

Supplementary European Search Report issued in European Application No. 16839023.5, dated Jul. 25, 2018 (4 pages).

Shigeta, J.; "High temperature gas corrosion in thermal-power-generation boiler", IIC Review, Japan, Oct. 2009, No. 42, pp. 14-18, URL; http://www.iic-hq.co.jp/library/pdf/042_04.pdf (6 pages).

Notification of Reasons for Refusal issued to JP Patent Application No. 2015-166695, dated Feb. 16, 2016 (5 pages).

Notification of Reasons for Refusal issued to JP Patent Application No. 2015-166695, dated Jun. 28, 2016 (6 pages).

Notification of Reasons for Refusal issued to JP Patent Application No. 2015-166695, dated Aug. 23, 2016 (5 pages).

Decision of Refusal issued to JP Patent Application No. 2015-166695, dated Jan. 31, 2017 (8 pages).

Notification of Reasons for Refusal issued to JP Patent Application No. 2015-166695, dated Jun. 20, 2017 (7 pages).

* cited by examiner

METHOD FOR PRODUCING ROASTED COFFEE BEANS IN RELATION TO CARBON MONOXIDE GENERATED

TECHNICAL FIELD

The a present invention is directed to a method for producing roasted coffee beans, a coffee bean roaster, and a method for determining the amount of carbon monoxide generated from roasting coffee beans.

BACKGROUND ART

Taste or aroma of coffee beans can be developed from coffee beans by roasting the coffee beans and the taste or aroma of coffee beans varies depending upon a roasting level. Therefore, in order to develop desired taste or aroma from coffee beans, it is necessary to produce coffee beans roasted to a desired roasting level.

As a method for producing coffee beans roasted to a desired roasting level, for instance, a method is known wherein an operator judges the state of roasting of coffee beans by performing operations including frequent check of color of coffee beans, color and amount of discharged smoke, aroma of smoke and ambient temperature in a roasting drum, etc. during roasting or listening to crack sounds generated by coffee beans undergoing roasting; and the operator operates a roasting machine so that the coffee beans are roasted to a desired roasting level.

In addition, Patent Document 1 discloses a coffee bean roaster comprising a roasting temperature sensor for detecting a roasting temperature of raw beans in a roasting drum or an exhaust temperature sensor for detecting a temperature of exhaust discharged from the roasting drum.

Patent Document 1: Japanese Unexamined Patent Application, Publication No. 2003-265154

DISCLOSURE OF THE INVENTION

Problems to be Solved by the Invention

However, there is a problem that the method of producing coffee beans by operators largely depends on the skill of individual operators.

On the other hand, if a roaster having a temperature detecting means as described in Patent Document 1 is used, it is possible to automatically produce coffee beans roasted to a desired roasting level by judging a roasting level based on temperatures, and thus it is possible to produce roasted coffee beans without relying on the skill of individuals such as operators.

However, according to the roasting temperature sensor for detecting roasting temperatures of coffee beans as described in Patent Document 1, it is merely possible to detect the temperature on the surface of coffee beans, and it is not possible to grasp the temperature inside the coffee beans. Therefore, the temperature of such coffee beans is inaccurate as an index of roasting level.

The present invention has been made in view of the above circumstances, and an object of the present invention is to provide a method for producing coffee beans, whereby in the production of coffee beans roasted to a desired level, coffee beans having an exact roasting level can be produced without depending upon the skill of an operator producing the coffee beans; a coffee bean roaster; and a method for determining the amount of carbon monoxide generated from roasting coffee beans.

Means for Solving the Problems

The present inventors found that by using the amount of carbon monoxide generated from coffee beans as an index of roasting level of coffee beans, coffee beans having an exact roasting level can be produced and completed the present invention. More specifically, the present invention provides the following.

(1) A method for producing roasted coffee beans comprising the step of supplying heat to coffee beans and thus roasting the coffee beans, wherein the method comprises the steps of: measuring an amount of carbon monoxide generated from the coffee beans during roasting, and adjusting a roasting condition in a roasting step in which heat is supplied to coffee beans, thus roasting the coffee beans, based on a measurement result obtained at the time of measurement of the amount of carbon monoxide.

(2) The method according to (1), wherein the step of adjusting the roasting condition is performed by stopping supply of heat to the coffee beans.

(3) A coffee bean roaster: comprising a roasting means having a heat source capable of supplying heat to coffee beans and thus being capable of roasting the coffee beans, a measuring means capable of measuring an amount of carbon monoxide generated from the coffee beans during roasting and an adjusting means capable of adjusting a roasting condition in the roasting means, based on a measurement result by the measuring means.

(4) The coffee bean roaster according to (3), wherein the adjusting means comprises a means capable of stopping supply of heat to the coffee beans.

(5) A method for determining correspondence relationship between a roasting level of coffee beans and an amount of carbon monoxide, wherein the method comprises the steps of: supplying heat to coffee beans and thus roasting the coffee beans, measuring the amount of carbon monoxide generated from the coffee beans during roasting in a roasting step in which heat is supplied to coffee beans, thus roasting the coffee beans, confirming a roasting level of the coffee beans at the time of measurement of the amount of carbon monoxide in the roasting step of the coffee beans, and determining the correspondence relationship between the roasting level of the coffee beans and the amount of carbon monoxide, based on a confirmation result of the roasting level of the coffee beans.

(6) A method for producing roasted coffee beans, comprising the step of supplying heat to coffee beans and thus roasting the coffee beans, wherein the method comprises the step of adjusting a roasting condition in a roasting step in which heat is supplied to coffee beans, thus roasting the coffee beans, when the amount of carbon monoxide generated from the coffee beans during roasting becomes 50 to 100 ppm, 101 to 200 ppm, 201 to 300 ppm, 301 to 400 ppm or 401 to 500 ppm.

Effects of the Invention

According to the present invention, it is possible to provide a method for producing coffee beans, whereby, in the production of coffee beans roasted to a desired roasting level, coffee beans having an exact roasting level can be produced without depending upon the skill of an operator producing the coffee beans, a coffee bean roaster, and a method for determining the amount of carbon monoxide generated from roasting coffee beans.

PREFERRED MODE FOR CARRYING OUT THE INVENTION

Hereinafter, embodiments of the present invention are described, but the present invention is not particularly limited thereto.

<Method for Producing Coffee Beans>

The method for producing coffee beans according to the present invention is a method for producing roasted coffee beans, comprising the step of supplying heat to coffee beans and thus roasting the coffee beans, wherein the method comprises the steps of measuring an amount of carbon monoxide generated from the coffee beans during roasting; and adjusting a roasting condition in a roasting step, based on a measurement result obtained at the time of measurement of the amount of carbon monoxide. When producing coffee beans roasted to a desired roasting level, such a configuration of the present invention enables to produce coffee beans having an exact roasting level without depending upon the skill of an operator producing the coffee beans. Further, according to the method for producing coffee beans of the present invention, it is unnecessary to adjust the index of roasting level depending upon the type of coffee beans.

In the method for producing coffee beans of the present invention, the reason why coffee beans having an exact roasting level can be produced regardless of the type of coffee beans is considered to be due to the point that carbon monoxide generated by roasting the coffee beans correlates with roasting level, and the correlation is almost constant regardless of the type of coffee beans.

Below, each step of the present invention is explained.
(Roasting Step)

The roasting step in the present invention is a step of supplying heat to coffee beans and thus roasting the coffee beans.

Heat can be supplied by using any known means used in conventional roasting of coffee beans. For example, heat can be supplied by blowing heat generated from a heat source such as an electric heater, etc. to coffee beans contained in a roasting container (for example, a rotating drum for roasting coffee beans), by using a compressor (blower), a blowing machine or the like, so that hot air can be applied to the coffee beans. As the heat to be supplied, a heating temperature ordinarily used for roasting coffee beans, for example, a temperature in the range of 100 to 300° C., can be used. In addition, as an air flow rate of hot air, an air flow rate within the range of 0.1 to 1 L per minute per g of coffee beans can be used. Incidentally, the coffee beans to be supplied with heat in the roasting step refer to the coffee beans which are raw materials for roasted coffee beans.

The amount of coffee beans is not particularly limited and can be appropriately set according to the purpose. For instance, usually, an amount of 50 to 500 g can be used. The amount of coffee beans is preferably 100 to 400 g, more preferably 150 to 300 g, since the amount of carbon monoxide generated from roasting coffee beans can be easily used as an appropriate index of roasting level of coffee beans, and 200 to 250 g is preferred.

The type of coffee beans used in the present invention is not particularly limited. In this way, the present invention is useful in that it is not necessary to adjust the index of roasting level depending upon the type of coffee beans, by utilizing roasting conditions, using the amount of carbon monoxide generated from roasting coffee beans as an indicator. Therefore, the type of coffee beans is not limited and conventional known types of coffee beans (for example, Guatemala, Brazil (Santos, Daterra etc.), Ethiopia (Mocha Yirgacheffee, etc.), Costa Rica, Kilimanjaro, Vietnam, Colombia, Tanzania, Mocha, Blue Mountain, Crystal Mountain, Kenya, Mandelin, Mexico, etc.) can be used. As to coffee beans, a single type or a combination of two or more may be used.

In the roasting step, coffee beans may be roasted while the roasting container (rotating drum) is rotated to mix the coffee beans. As conditions for rotation, conventional known conditions, for instance, a condition of 10 to 60 rpm, can be employed.

In the roasting step, temperatures within the roasting container may be measured by using a temperature measuring means such as a temperature sensor or may not be measured. It is possible to confirm the temperature of atmosphere within the roasting container at the time of roasting, by measuring the temperature within the roasting container.

In order to remove chaff of coffee beans (so-called silver skin) under roasting, chaff generated by roasting may be recovered in the roasting step of the present invention.

In the roasting step of the present invention, roasting time is determined by itself, depending upon the set value of carbon monoxide as the index and roasting may be performed, for instance, within 300 to 1500 seconds.
(Measuring Step)

The measuring step in the present invention is a step in which an amount of carbon monoxide generated from coffee beans during roasting is measured.

The amount of carbon monoxide to be measured may be either an absolute amount or a relative amount (concentration) of the carbon monoxide generated.

As the measuring means of carbon monoxide (sensor) to be used in the measuring step, for instance, NAP-505, etc. manufactured by Nemoto & Co., Ltd. may be used.

In the measuring step, measurement may be performed at the same site as the site where roasting is performed or measurement may be performed on exhaust discharged from the site where roasting is performed. As described above, when measurement is performed on discharged exhaust in order to more accurately measure carbon monoxide, it is preferred to remove extraneous material by filter (for instance, chaff filter, etc.) at the time of directing carbon monoxide to the measuring means for measuring carbon monoxide. Further, directing gas is preferably performed at a constant speed in order to accurately measure the amount of carbon monoxide. Directing carbon monoxide gas may be performed by using a gas pump in order to control the speed of directing gas; alternatively, it may also be preferably to not use a gas pump. When pressure at the site of measurement changes due to directing gas, gas may escape outside the measurement site in order to maintain the pressure at the measurement site constant.

Measurements may be performed continuously or intermittently.

(Adjusting Step)

The adjusting step in the present invention is a step in which adjusting a condition in the roasting step is adjusted based on the measurement result obtained at the time of measurement of the amount of carbon monoxide described above.

The measurement result obtained at the time of measurement of the amount of carbon monoxide is used as the index for adjusting a condition of roasting conditions. For instance, since it is possible to grasp a roasting level of coffee beans by the measurement result at the time of measurement of the amount of carbon monoxide, it is possible to adjust a roasting condition, depending upon the roasting level.

Adjustment of roasting conditions can be appropriately set depending upon purpose, and may be performed by stopping supply of heat to the coffee beans. Alternatively, progressing speed, etc. of roasting may be adjusted by changing a condition of supply of heat to coffee beans (for instance, a temperature of heat source, a condition of blowing, a condition of rotation of the rotating drum, etc.), in conjunction with the roasting level of coffee beans. The adjustment of roasting condition is preferably performed based on detection that the concentration of carbon monoxide has reached a preset concentration, since such detection is simple, convenient and accurate.

The method for producing coffee beans of the present invention may be a method for producing roasted coffee beans comprising the step of supplying heat to coffee beans and thus roasting the coffee beans, wherein the method comprises the step of adjusting a roasting condition in a roasting step when the amount of carbon monoxide generated from the coffee beans during roasting becomes 50 to 100 ppm, 101 to 200 ppm, 201 to 300 ppm, 301 to 400 ppm or 401 to 500 ppm. In this case, as the step of adjusting a roasting condition, the step which is the same as that described above may be used.

<Coffee Bean Roaster>

The coffee bean roaster of the present invention is a coffee bean roaster which may be used in the method for producing coffee beans of the present invention described above. Below, roaster 1 which is an embodiment of the present invention is explained with reference to FIG. 1.

Figure 1:
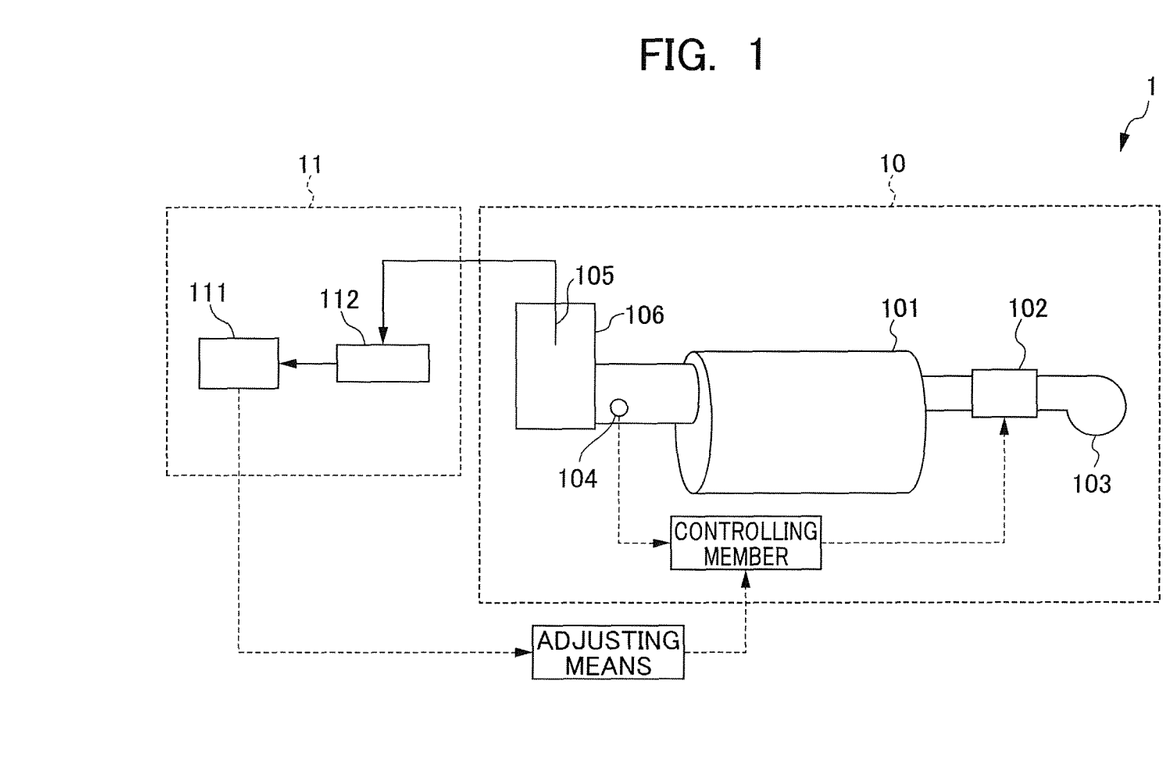
FIG. 1 shows an embodiment of the coffee bean roaster according to the present invention.

As illustrated in FIG. 1, roaster 1 comprises roasting means 10, sensor unit 11 comprising measuring means 111, and an adjusting means. Below, each of the means is explained.

(Roasting Means 10)

Roasting means 10 is a means having a heat source capable of supplying heat to coffee beans and thus being capable of roasting the coffee beans. As the coffee bean roaster of the present invention, any known coffee bean roasting means may be used and in the present embodiment, roasting means 10 comprises roasting container 101, heat source 102, blowing member 103, temperature measuring member 104, exhausting member 105, chaff collector 106, and a controlling member.

Roasting container 101 is a container for containing coffee beans. Roasting container 101 is preferably configured so as to be rotatable to mix coffee beans. Further, as roasting container 101, it is possible to use a roasting container whose rotating conditions can be made to be the same as those of the method for producing coffee beans of the present invention as described above. Heat source 102 is a means for generating heat and, for instance, an electric heater, etc. can be used. As heat source 102, a heat source may be used which can achieve the same heating temperature as the heating temperature of the method for producing coffee beans of the present invention described above. Blowing member 103 is a means which can blow heat generated from heat source 102 to the coffee beans contained in roasting container 101. As blowing member 103, a blowing member may be used which can achieve the same blowing conditions as the blowing conditions of the method for producing coffee beans of the present invention described above. As blowing member 103, for instance, a compressor (blower), etc. may be used. Temperature measuring member 104 is a means for measuring temperature of atmosphere within roasting container 101. Exhausting member 105 is a site configured to be able to direct carbon monoxide to measuring means 111 described below. Chaff collector 106 is a means for removing chaff (so-called silver skin) of coffee beans. The controlling member is a means which can change a roasting condition of coffee beans. For instance, it is possible to change and control a roasting condition, in response to an instruction from an adjusting member described below. For instance, in response to an instruction from an adjusting means described below, it is possible to control so that roasting is terminated (namely, supply of heat from the heat source is stopped) and cooling is started in roasting container 11 or cooling is started and then cooling is stopped by using matter that the temperature at an outlet becomes constant as an index.

(Sensor Unit 11)

Sensor unit 11 is a unit configured to be able to measure an amount of carbon monoxide directed from roasting means 10. In the present embodiment, sensor unit 11 comprises measuring means 111 and is configured so as to further comprise filter 112.

Measuring means 111 is a means which is able to measure the amount of carbon monoxide generated from coffee beans during roasting. As measuring means 111, for instance, NAP-505, etc. manufactured by Nemoto & Co., Ltd. may be used. In the present embodiment, although measuring means 111 is configured as a part of sensor unit 11 which is separate from roasting means 10, so that carbon monoxide exhausted from roasting means 10 is measured, measuring means 111 may be equipped inside roasting means 10.

As illustrated in FIG. 1, filter 112 is arranged in a pathway of carbon monoxide through which the carbon monoxide sent from roasting means 10 passes to reach measuring means 111. Since filter 112 can remove extraneous material (for instance, chaff) while carbon monoxide is directed to measuring means 111, it is possible to perform more accurate measurement. As filter 112, chaff filter, etc. may be used.

Further, though not equipped in the present embodiment, sensor unit 11 may further comprise a gas pump to direct carbon monoxide to measuring means 111.

(Adjusting Means)

The adjusting means is a means which can adjust a roasting condition in the roasting means, based on the measurement result by the measuring means.

The adjusting means receives data output of measurement values of carbon monoxide from measuring means 111 and instructs a control member of roasting means 10 to change a roasting condition, based on the data. This enables roasting means 10 to adjust a roasting condition.

With respect to the adjusting means, the means for adjusting a roasting condition may be appropriately selected, depending upon purpose, and may be, for instance, a means which can stop supply of heat to coffee beans. More specifically, in the present embodiment, the means for adjusting a roasting condition may be a means capable of instructing the control member to stop supply of heat to coffee beans. Alternatively, the means for adjusting a roasting condition may be a means which is capable of adjusting progressing speed, etc. of roasting by changing a condition of supply of heat to coffee beans (for instance, temperature of heat source, a condition of blowing, a condition of rotation of rotating drum, etc.), in conjunction with the roasting level of coffee beans. It is possible to conveniently and accurately perform roasting by configuring the adjusting means so that adjusting is performed based on detection that the concentration of carbon monoxide has reached a preset concentration. Therefore, the adjusting means is preferably configured so that adjusting is performed based on detection that the concentration of carbon monoxide has reached a preset concentration.

Further, though not equipped in the present embodiment, the adjusting means may be configured so as to instruct on and off of a switch of a gas pump in sensor unit 11. Further, though not equipped in the present embodiment, the adjusting means may be configured so as to send data to another computer (personal computer) to record the data (for instance, concentration of carbon monoxide, elapsed time after the start of roasting, temperature in roasting temperature, and air temperature, etc.)

(Method of Use)

Below, an example of method of use of coffee bean roaster 1 of the present invention is explained.

First of all, in the adjusting means, type and amount (for instance, concentration) of carbon monoxide, which are used as indexes for changing a roasting condition, are set up. Then, coffee beans are contained in roasting means 10 and roasting is started. Roasting starts as follows: at the beginning, heat source 102 emits heat, which is blown by blowing member 103, so that the coffee beans are exposed to hot air. At this time, by rotating roasting container 101, the coffee beans are mixed so that the coffee beans are uniformly exposed to hot air.

Since carbon monoxide is generated from the coffee beans by roasting, the carbon monoxide is directed from exhausting member 105 to measuring means 111 through filter 112 of sensor unit 11. Once it is detected by measuring means 111 that the amount of carbon monoxide has reached a preset amount of carbon monoxide, the adjusting means instructs the control member of roasting means 10 to change a roasting condition.

Coffee bean roaster 1 of the present invention as described above is configured to comprise a roasting means 10 having a heat source capable of supplying heat to coffee beans and thus being capable of roasting the coffee beans; a measuring means 111 capable of measuring the amount of carbon monoxide generated from roasting coffee beans; and an adjusting means capable of adjusting a roasting condition of the roasting means, based on the measurement result by the measuring means 111. When producing coffee beans roasted to a desired roasting level, such a configuration of the coffee bean roaster of the present invention enables to produce coffee beans having an exact roasting level without depending upon the skill of an operator producing the coffee beans and without adjusting the index of roasting level depending upon the type of coffee beans.

<Method of Determining Correspondence Relationship Between Roasting Level of Coffee Beans and Amount of Carbon Monoxide>

The present invention is a method for determining correspondence relationship between a roasting level of coffee beans and an amount of carbon monoxide, wherein the method encompasses a method comprising the steps of supplying heat to coffee beans and thus roasting the coffee beans; measuring an amount of carbon monoxide generated from the coffee beans during roasting in a roasting step of the coffee beans; confirming a roasting level of the coffee beans at the time of measurement of the amount of carbon monoxide in the step of roasting the coffee beans; and determining the correspondence relationship between the roasting level of the coffee beans and the amount of carbon monoxide, based on the confirmation result of the roasting level of the coffee beans.

According to the method for producing coffee beans and the coffee bean roaster of the present invention described above, it is not necessary to adjust the index of roasting level depending upon the type of coffee beans, but it is sometimes necessary to adjust the index of roasting level, depending upon the amount of coffee beans or a blowing condition of hot air. However, by the method of the present invention, it is possible to determine the correspondence relationship between the roasting level of coffee beans and the amount of carbon monoxide and therefore it is possible to use [the correspondence relationship] in adjusting the amount of carbon monoxide which is an index of roasting level.

(Roasting Step)

The roasting step in the present invention is a step in which heat is supplied to coffee beans and the coffee beans are roasted. As the roasting step in the present invention, the same step can be used as that in the method for producing coffee beans of the present invention as described above.

(Measuring Step)

The measuring step in the present invention is a step in which an amount of carbon monoxide generated from coffee beans during roasting in a roasting step of the coffee beans is measured. As the measuring step in the present invention, the same step as that in the method for producing the coffee beans of the present invention as described above can be used.

(Roasting Level Confirmation Step)

The roasting level confirmation step in the present invention is a step in which a roasting level of coffee beans at the time of measurement of the amount of carbon monoxide is confirmed in the roasting step of coffee beans.

The confirmation of roasting level of coffee beans can be performed by using a conventionally known method. For instance, confirmation of roasting level can be performed by using a kit of measurement instrumentation by Agtron Inc. (Agtron scale).

(Determining Step)

The determining step in the present invention is a step in which the correspondence relationship between the roasting level of coffee beans and the amount of carbon monoxide is determined based on the confirmation result of the roasting level of coffee beans as described above.

The determination of amount of carbon monoxide can be performed, for instance, by collating the confirmation result of roasting level of coffee beans with a measured value of the amount of carbon monoxide generated from the corresponding coffee beans during roasting. For instance, given that when the roasting level according to the measurement kit of Agtron Inc. was Light Medium, the amount of carbon monoxide was 400 ppm, if the roasting level of Light Medium is desired, the amount of carbon monoxide which can be the index of roasting level of coffee beans can be determined to be 400 ppm. As described above, it is possible to prepare a calibration curve or table relating to the correspondence relationship between the roasting level of coffee beans and the amount of carbon monoxide.

EXAMPLES

Example 1

<Preparation of Roaster 1A>

Figure 2:
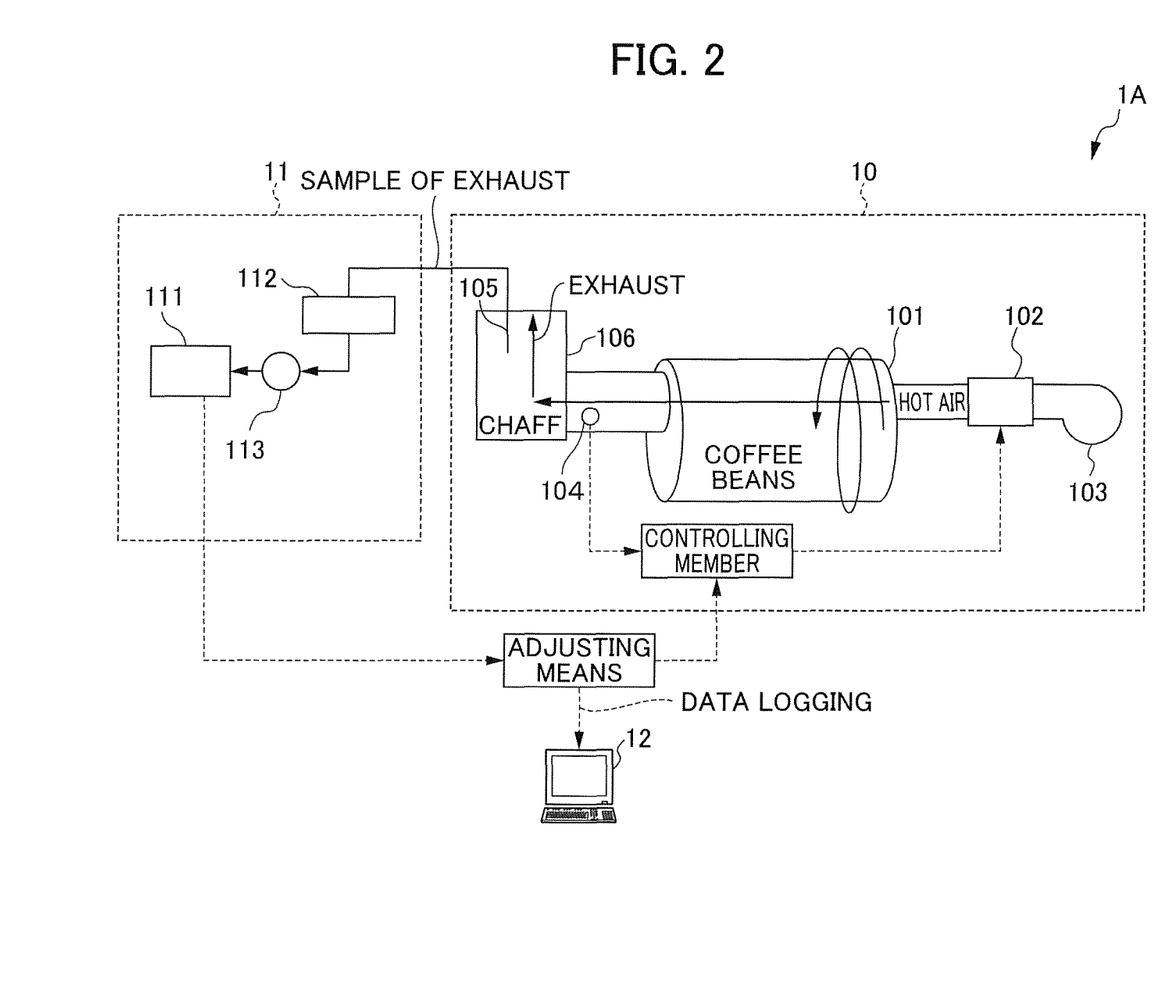
FIG. 2 shows an embodiment wherein coffee beans are roasted using a coffee bean roaster according to an embodiment of the present invention.
Figure 3:
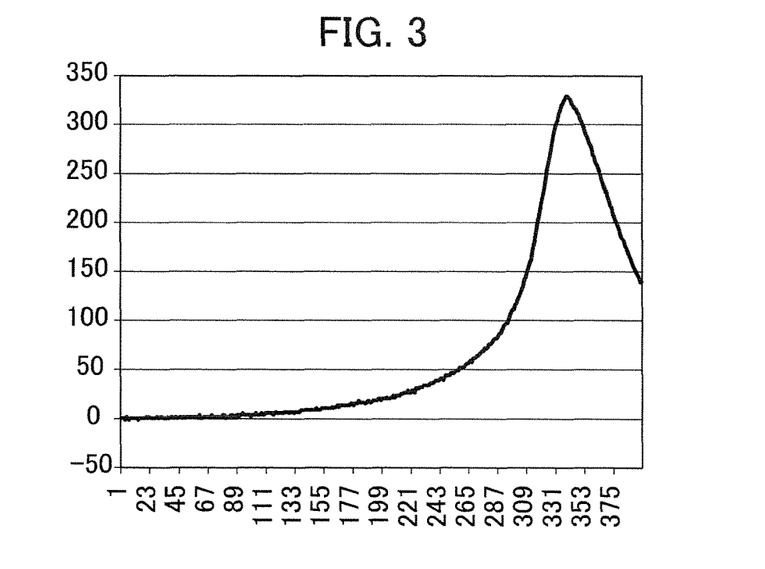
FIG. 3 shows a graph indicating change over time in concentration of carbon monoxide due to roasting of coffee beans.
Figure 4:
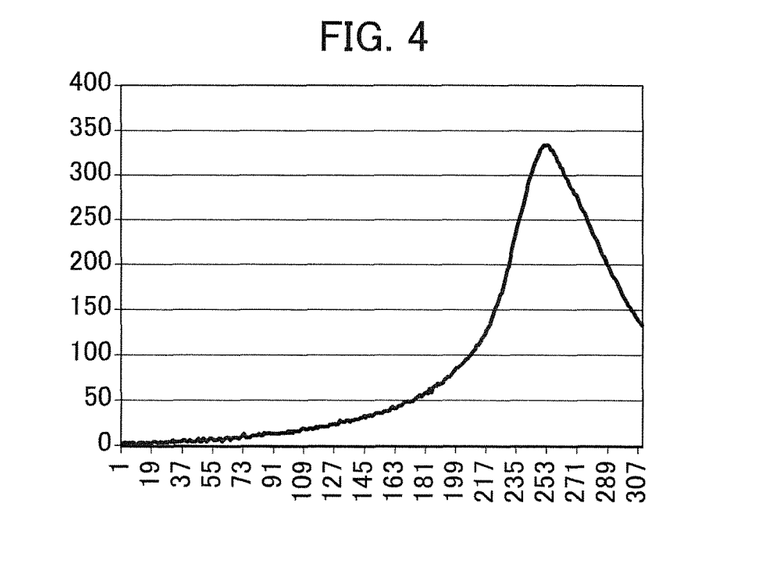
FIG. 4 shows a graph indicating change over time in concentration of carbon monoxide due to roasting of coffee beans.
Figure 5:
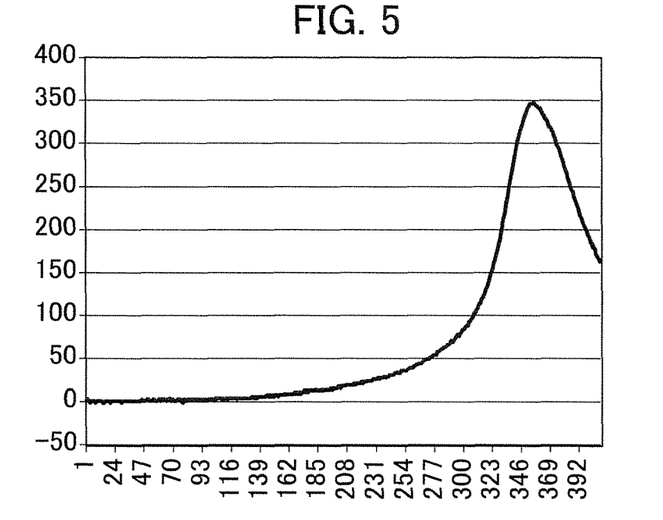
FIG. 5 shows a graph indicating change over time in concentration of carbon monoxide due to roasting of coffee beans.
Figure 6:
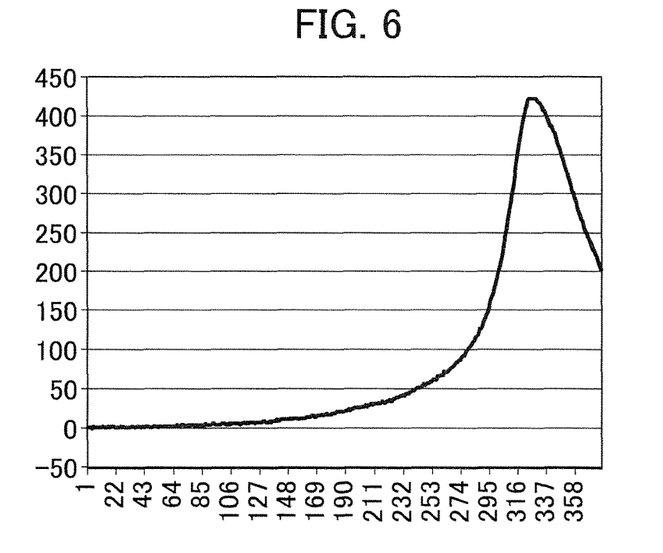
FIG. 6 shows a graph indicating change over time in concentration of carbon monoxide due to roasting of coffee beans.
Figure 7:
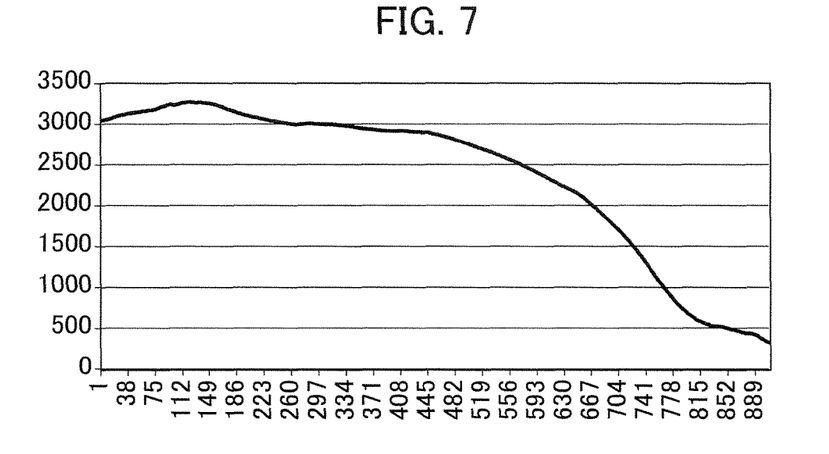
FIG. 7 shows a graph indicating change over time in concentration of volatile gases due to roasting of coffee beans (Brazil Daterra Reserve)
Figure 8:
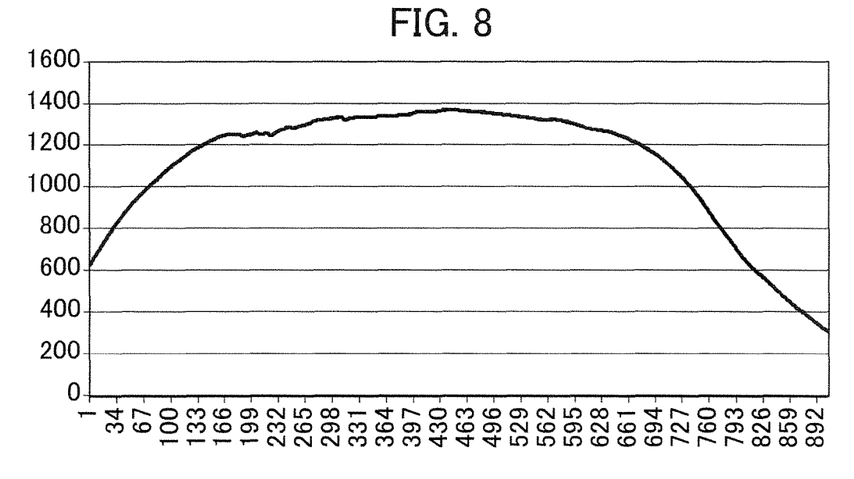
FIG. 8 shows a graph indicating change over time in concentration of volatile gases due to roasting of coffee beans (Guatemala)
Figure 9:
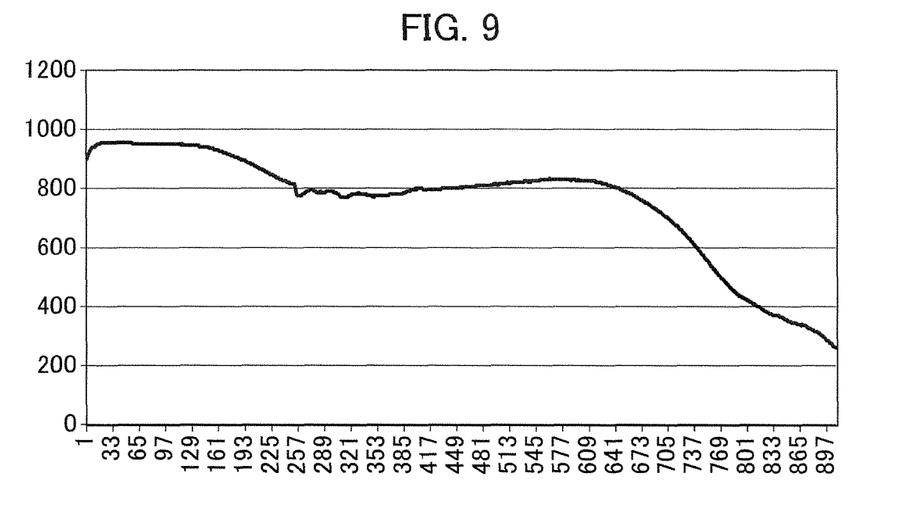
FIG. 9 shows a graph indicating change over time in concentration of volatile gases due to roasting of coffee beans (Brazil Daterra Reserve)
Figure 10:
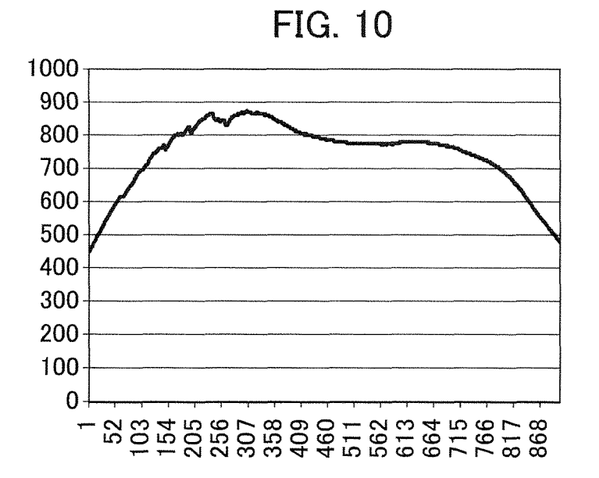
FIG. 10 shows a graph indicating change over time in concentration of volatile gases due to roasting of coffee beans (Ethiopian Mocha Yirgacheffe)
Figure 11:
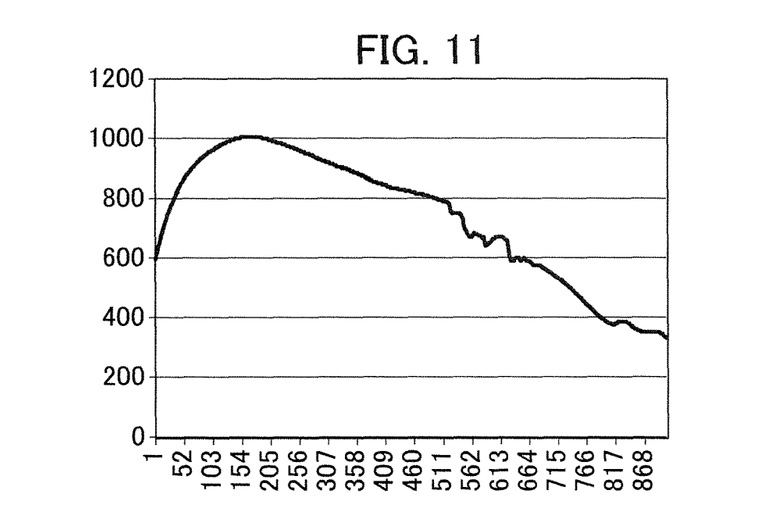
FIG. 11 shows a graph indicating change over time in concentration of volatile gases due to roasting of coffee beans (Brazil Daterra Reserve)
Figure 12:
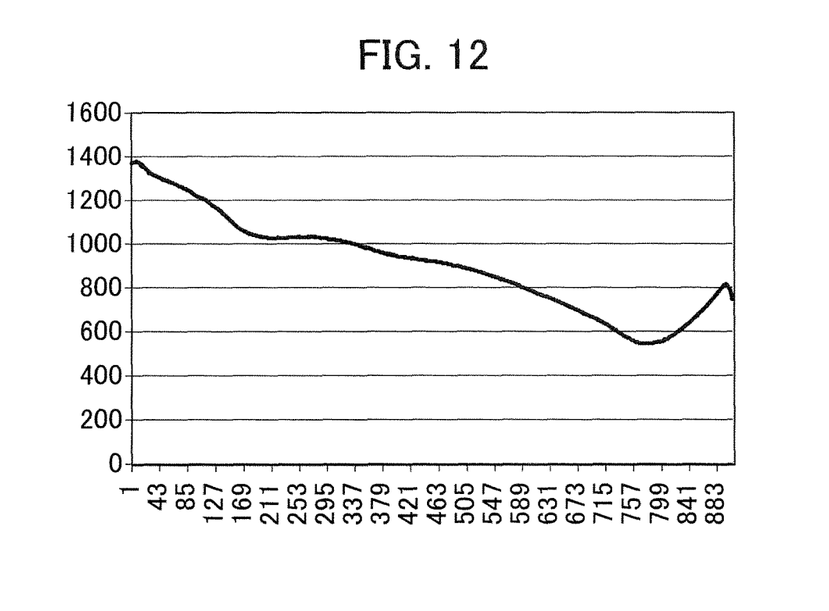
FIG. 12 shows a graph indicating change over time in concentration of volatile gases due to roasting of coffee beans (Brazil Daterra Sweet Yellow)

As roaster 1A, a roaster comprising roasting means 10, sensor unit 11 comprising measuring means 111 and an adjusting means was made (refer to FIG. 2). Each of the means is explained in detail.

[Roasting Means 10]

As roasting means 10, Gene Cafe CBR-101 (manufactured by GeneSys Inc.) was used. The roasting means comprises roasting container 101, an electric heater as heat source 102, a blower as blowing member 103, a temperature sensor as temperature measuring member 104, chaff collector 106, exhausting member 105, and a controlling member. The controlling member is a member which may directly change a roasting condition of coffee beans, depending upon a temperature or a timer of roasting time. Upon receiving an instruction from the adjusting member, after the termination of roasting by timer, the controlling member starts cooling in roasting member 10, and stops cooling when the temperature of exhausting member 105 becomes 60° C. Exhausting member 105 was designed so that exhaust gas is supplied to sensor unit 11.

[Sensor Unit 11]

Sensor unit 11 comprising measuring means 111 was designed so as to further comprise filter 112 and gas pump 113. Details of each of the means are as follows.

(Measuring Means 111)

As measuring device 111, a sensor device of NAP-505 manufactured by Nemoto & Co., Ltd. (measuring range of CO: 0 to 1,000 ppm) was used to measure CO (carbon monoxide). Further, it was set so as to amplify the output from the CO sensor, and then transmit the output result to the adjusting means.

(Chaff Filter 112)

Chaff filter 112 is a member for removing extraneous material such as chaff which is mixed in the exhaust gas supplied from exhausting member 105 of roasting means 10.

As chaff collector 112, an accessory of Gene Cafe CBR-101 (manufactured by GeneSys Co. Ltd.) was used.

(Gas Pump 113)

Gas pump 113 is a member for directing exhausted gas from exhausting member 105 in roasting means 10, to measuring means 111. As gas pump 113, NF-11 manufactured by KNF Flodos AG was used. The performance of the gas pump was 100 mL/minute.

[Adjusting Means]

As the adjusting means, a means designed as follows was made.

The adjusting means was set so that the adjusting means receives an output of data regarding a CO gas concentration from measuring means 111 (NAP-505 manufactured by Nemoto & Co., Ltd.) and when the CO gas concentration exceeds, for continuous three seconds, a preset CO gas concentration as a list of instructions for producing roasted coffee beans ("gas concentration set value" of Table 2 described below), it judges that the CO gas concentration has reached the preset value and sends the controlling member an instruction to stop supply of heat to coffee beans by the roasting means 10 (namely, to stop roasting) and shift the Gene Café to a cooling mode. Further, the adjusting means was set to instruct to turn a switch of gas pump 113 in the sensor unit on or off. Further, the adjusting means was set to direct CO gas concentrations, the number of seconds of elapse, preset temperatures set in a recipe and air temperatures to computer 12 (personal computer) in order to record data.

<Production of Coffee Beans>

As coffee beans, 250 g of coffee beans of each of Guatemala (SHB) of *Arabica* type and Brazil (Daterra Sweet Yellow) were roasted by setting the CO gas concentrations of 100 ppm, 200 ppm, 400 ppm and 500 ppm as indexes of the termination of roasting.

<Judgment of Roasting Level of Coffee Beans>

The roasting level of the roasted coffee beans described above was judged using the measurement kit of Agtron Inc. (Agtron scale).

The judgment of roasting level of coffee beans was performed by collating coffee beans pulverized and compressed into the state of powder, with eight color samples in the kit. The roasting levels and the numbers of color samples correspond to each other as shown in Table 1 below.

TABLE 1

| Roasting level | Number of color sample |
| --- | --- |
| Very Light | 95 |
| Light | 85 |
| Moderately Light | 75 |
| Light Medium | 65 |
| Medium | 55 |
| Moderately Dark. | 45 |
| Dark | 35 |
| Very Dark | 25 |

<Judgment Results>

The judgment results of roasting levels regarding each type of the coffee beans produced are shown in Table 2 below. Incidentally, each of numerical values in the item "roasting level of coffee beans" in Table 2 indicates the number of color samples in Table 1 above. Further, the "air temperature" in Table 2 refers to an averaged air temperature measured every one second from the start of roasting to the termination of roasting. The temperature sensor for measuring air temperatures was installed in the place which was not affected by the heat from the roaster, i.e., on a site which was separated from the roaster by about 30 cm.

TABLE 2

| Type of coffee beans | Gas concentration set value | Roasting level of coffee beans after roasting | Air temperature | Roasting time (second(s)) |
| --- | --- | --- | --- | --- |
| Guatemala | 100 ppm | 65 | 29.7 | 874 |
| Brazil | 100 ppm | 65 | 29.0 | 915 |
| Guatemala | 400 ppm | 55 | 28.0 | 903 |
| Brazil | 400 ppm | 55 | 27.3 | 978 |
| Guatemala | 500 ppm | 45 | 26.8 | 938 |
| Brazil | 500 ppm | 45 | 25.7 | 1008 |

As shown in Table 2, in any CO gas concentration setting, the roasting time of Brazil was longer by from 41 to 70 seconds than that of Guatemala, but the judgment results of roasting level by the Agtron were almost the same in both types of coffee beans, Guatemala or Brazil, provided that the CO gas concentration setting was the same. From this result, it was indicated that coffee beans roasted to a desired roasting level could be exactly produced, regardless of the type of coffee beans, by adjusting a roasting condition for the coffee beans, using the CO gas concentration exhausted from the roaster as the index.

<Measurement of Carbon Monoxide Concentration and Volatile Gas Concentration>

The relationship between the roasting time and the concentration of carbon monoxide or that of volatile gases generated from coffee beans was verified by roasting coffee beans and measuring the concentration of carbon monoxide or that of volatile gases generated from the coffee beans over time.

[Measurement of Concentration of Carbon Monoxide]

Coffee beans were roasted with the same means as roaster 1A above, and the concentration of carbon monoxide was measured over time. As the coffee beans, 250 g of *Arabica* species from Santos of Brazil were used and the roasting was performed for four lots in total. The gas concentration set value at which the roasting is stopped was set to be 300 ppm.

[Measurement of Concentration of Volatile Gas]

Coffee beans were roasted for 900 seconds to measure the concentration of volatile gases over time by using the same roaster as roaster 1A above, except that as the measuring means, TGS2450 manufactured by Figaro Engineering Inc. (capable of detecting methyl mercaptane and hydrogen sulfide, etc. as volatile gases) was used. As the coffee beans, 250 g of each type of coffee beans of Brazil Daterra Reserve, Guatemala, Ethiopian Mocha Yirgacheffe and Brazil Daterra Sweet Yellow were used. Roasting was performed with respect to three lots of Brazil Daterra Reserve, one lot of Guatemala, one lot of Ethiopian Mocha Yirgacheffe, and one lot of Brazil Daterra Sweet Yellow, namely six lots in total of coffee beans.

[Measurement Results]

Each of the measuring results is shown in FIGS. 3 to 12. Graphs of FIGS. 3 to 6 indicate the relationship between the roasting time and the concentration of carbon monoxide generated from coffee beans. The horizontal axes of graphs 3 to 6 indicate the roasting time (second(s)) in the occasion that the time point of 680 seconds after the start of roasting (time of termination of roasting) is defined to be zero point. The vertical axes indicate the concentrations (ppm) of carbon monoxide generated from coffee beans. Graphs 7 to 12 indicate the relationship between roasting time and the concentration of volatile gas generated from coffee beans. The horizontal axes of graphs 7 to 12 indicate the roasting time (second(s)) and the vertical axes indicate voltage (mV), which is an index of the concentration of volatile gases generated from coffee beans. In the vertical axes of graphs 7 to 12, a higher voltage indicates that the concentration of volatile gases generated from coffee beans is low and a lower voltage indicates that the concentration of volatile gases generated from coffee beans is high.

As indicated in graphs 7 to 12, there was variability among the changes in concentrations over time of volatile gases generated from coffee beans by roasting, depending upon difference in lots of the coffee beans and therefore it was suggested that the correspondence relationship between the concentration of volatile gases and the roasting level has variability due to individual differences. Contrary to this, as indicated in FIGS. 3 to 6, it was found that the change in concentrations over time of carbon monoxide generated from coffee beans by roasting is almost constant, even when lots of coffee beans differ from each other. From this, it was suggested that there is correlation between the carbon monoxide generated at the time of termination of roasting by roasting the coffee beans, and the roasting level, and additionally, that the correlation is almost constant regardless of individual differences of coffee beans.

Example 2

<Preparation of Roaster 1A>

Roaster 1A was made in the same manner as Example 1.

<Production of Coffee Beans>

As coffee beans, 250 g of each of Guatemala (SHB), Santos No. 2 and Mocha Sidamo were roasted by setting the CO gas concentrations of 50 ppm, 100 ppm, 200 ppm and 800 ppm as the indexes for the termination of roasting.

<Judgment of Roasting Levels of Coffee Beans>

As the roasting level of coffee beans after roasting, L value (lightness value) was measured. The L value was calculated as an average of three measurement values by using an L value measurement device (X-Rite SP 64 integrated sphere spectrophotometer) under the conditions of CIE, L*a*b*, D65, SPEX (specular excluded reflectance).

<Judgment Results>

Regarding each of the coffee beans produced, the judgement results of roasting levels are indicated in Table 3 below.

TABLE 3

| Type of coffee beans | Gas concentration set value | L value of coffee beans after roasting |
| --- | --- | --- |
| Guatemala | 50 ppm | 28.54 |
| Santos No. 2 | 50 ppm | 26.72 |
| Mocha Sidamo | 50 ppm | 26.66 |
| Guatemala | 100 ppm | 24.63 |
| Santos No. 2 | 100 ppm | 23.80 |
| Mocha Sidamo | 100 ppm | 24.07 |
| Santos No. 2 | 200 ppm | 22.83 |
| Guatemala | 200 ppm | 22.60 |
| Mocha Sidamo | 200 ppm | 22.65 |
| Guatemala | 800 ppm | 20.60 |
| Santos No. 2 | 800 ppm | 20.73 |
| Mocha Sidamo | 800 ppm | 20.68 |

As can be seen from this table, it was found that if it is assumed that the CO gas concentration is constant as the index for termination of roasting, it is possible to make the L value which is a quantitative index for roasting level to be constant regardless of the type of coffee beans. Also from this result, it was indicated that the coffee beans roasted to a desired roasting level could be exactly produced, regardless of the type of coffee beans, by adjusting a roasting condition for the coffee beans by using the CO gas concentration exhausted from the roaster as the index.

EXPLANATION OF REFERENCE NUMERALS

1 Roaster
1A Roaster
10 Roasting means
101 Roasting container
102 Heat source
103 Blowing member
104 Temperature measuring member
105 Exhausting member
106 Chaff collector
11 Sensor unit
111 Measuring means
112 Filter
113 Gas pump
12 Computer

The invention claimed is:

1. A method for producing roasted coffee beans comprising:
  a roasting step of supplying heat to coffee beans and thus roasting the coffee beans;
  a measuring step of measuring an amount of carbon monoxide generated from the coffee beans during roasting; and
  a stopping step of stopping supply of heat to the coffee beans in the roasting step when the measured amount of carbon monoxide reaches a preset amount of carbon monoxide measured beforehand during roasting of coffee beans different from the coffee beans at least in one of type and lot.

2. A method for producing roasted coffee beans, comprising:
  a roasting step of supplying heat to coffee beans and thus roasting the coffee beans;
  a measuring step of measuring an amount of carbon monoxide generated from the coffee beans during roasting in the roasting step;
  a judging step of judging a roasting level of the coffee beans at the time of measurement of the amount of carbon monoxide; and
  a determining step of determining the correspondence relationship between the roasting level of the coffee beans and the amount of carbon monoxide, using the correspondence relationship as an index of roasting level in roasting coffee beans different from said coffee beans at least in one of type and lot.

3. The method according to claim 2, wherein the roasting level is judged by referring to a lightness value which is an average of three measurement values of the coffee beans.

4. The method according to claim 2, wherein the roasting level is judged by referring to a color of the coffee beans.

* * * * *